US007464086B2

(12) United States Patent  
Black et al.

(10) Patent No.: US 7,464,086 B2
(45) Date of Patent: Dec. 9, 2008

(54) METATAG-BASED DATAMINING

(75) Inventors: Peter M. Black, Pacific Palisades, CA (US); Anthony Bryan Waters, Cave Creek, AZ (US)

(73) Assignee: Yahoo! Inc., Sunnyvale, CA (US)

( * ) Notice: Subject to any disclaimer, the term of this patent is extended or adjusted under 35 U.S.C. 154(b) by 69 days.

(21) Appl. No.: 09/952,827

(22) Filed: Sep. 14, 2001

(65) Prior Publication Data

US 2002/0035573 A1 Mar. 21, 2002

Related U.S. Application Data

(63) Continuation-in-part of application No. 09/738,471, filed on Dec. 15, 2000, and a continuation-in-part of application No. 09/703,006, filed on Oct. 31, 2000, and a continuation-in-part of application No. 09/630,227, filed on Aug. 1, 2000.

(51) Int. Cl.
G06F 17/30 (2006.01)
G06F 7/00 (2006.01)
(52) U.S. Cl. .......................................... 707/5; 705/26
(58) Field of Classification Search .................. 707/1–5, 707/10; 709/217–219; 705/26, 27
See application file for complete search history.

(56) References Cited

U.S. PATENT DOCUMENTS

| 4,972,349 | A | * | 11/1990 | Kleinberger | 707/1 |
|---|---|---|---|---|---|
| 5,297,039 | A | * | 3/1994 | Kanaegami et al. | 707/5 |
| 5,359,724 | A | | 10/1994 | Earle | 707/205 |
| 5,440,481 | A | * | 8/1995 | Kostoff et al. | 707/5 |
| 5,598,557 | A | * | 1/1997 | Doner et al. | 707/5 |
| 5,619,410 | A | | 4/1997 | Emori et al. | 704/7 |
| 5,659,732 | A | | 8/1997 | Kirsch | 707/5 |
| 5,768,581 | A | | 6/1998 | Cochran | 707/5 |
| 5,774,660 | A | | 6/1998 | Brendel et al. | 709/201 |
| 5,778,397 | A | | 7/1998 | Kupiec et al. | 715/500 |
| 5,794,237 | A | | 8/1998 | Gore, Jr. | 707/5 |
| 5,796,952 | A | * | 8/1998 | Davis et al. | 709/224 |

(Continued)

FOREIGN PATENT DOCUMENTS

WO          WO 99/45487          9/1999

OTHER PUBLICATIONS

Zaiane, O.R., M. Xin and J. Han "Discovering Web Access Patterns and Trends by Applying OLAP and Data Mining Technolog on Web Logs", Proceedings of the Conference on Advances in Digital Libraries (ADL'98), Apr. 1998.*

(Continued)

*Primary Examiner*—Luke S Wassum
(74) *Attorney, Agent, or Firm*—Seth H. Ostrow; Dreier LLP

(57) ABSTRACT

A system for displaying products or services for purchase on any document displayed on any computer device, comprising conducting a statistical frequency analysis of the word occurrence in the document to determine the primary subject matter of the document and/or keywords in the document, selecting products which are relevant to the subject matter and keywords of the document, either by manual selection or by automatic selection. Conducting a statistical frequency analysis of the word occurrence in the product or service descriptions, to determine the keywords in the product descriptions, and matching the keywords from the document with the keywords from the product descriptions accomplish automatic selection.

13 Claims, 8 Drawing Sheets

U.S. PATENT DOCUMENTS

| | | | |
|---|---|---|---|
| 5,845,278 A | | 12/1998 | Kirsch et al. .................... 707/3 |
| 5,857,179 A | * | 1/1999 | Vaithyanathan et al. ......... 707/2 |
| 5,918,240 A | | 6/1999 | Kupiec et al. ............... 715/531 |
| 5,920,854 A | | 7/1999 | Kirsch et al. .................... 707/3 |
| 5,924,108 A | * | 7/1999 | Fein et al. .................... 715/531 |
| 5,933,811 A | * | 8/1999 | Angles et al. ................. 705/14 |
| 5,948,061 A | * | 9/1999 | Merriman et al. ........... 709/219 |
| 5,983,216 A | | 11/1999 | Kirsch et al. .................... 707/2 |
| 6,006,252 A | * | 12/1999 | Wolfe .......................... 709/203 |
| 6,016,504 A | * | 1/2000 | Arnold et al. ............... 709/200 |
| 6,094,649 A | * | 7/2000 | Bowen et al. ................... 707/3 |
| 6,185,531 B1 | * | 2/2001 | Schwartz et al. ......... 704/256.1 |
| 6,226,645 B1 | * | 5/2001 | Bae et al. ...................... 707/10 |
| 6,278,992 B1 | | 8/2001 | Curtis et al. .................... 707/3 |
| 6,330,592 B1 | * | 12/2001 | Makuch et al. ............. 709/217 |
| 6,336,131 B1 | * | 1/2002 | Wolfe .......................... 709/203 |
| 6,338,050 B1 | * | 1/2002 | Conklin et al. ............... 705/80 |
| 6,341,305 B2 | * | 1/2002 | Wolfe .......................... 709/203 |
| 6,421,675 B1 | * | 7/2002 | Ryan et al. .................. 707/100 |
| 6,460,036 B1 | * | 10/2002 | Herz ............................ 707/10 |
| 6,463,428 B1 | | 10/2002 | Lee et al. ........................ 707/3 |
| 6,505,194 B1 | | 1/2003 | Nikolovska et al. ............ 707/3 |
| 6,546,386 B1 | * | 4/2003 | Black et al. ..................... 707/4 |
| 6,651,253 B2 | * | 11/2003 | Dudkiewicz et al. ........ 725/114 |
| 6,684,206 B2 | * | 1/2004 | Chen et al. ...................... 707/3 |
| 6,766,320 B1 | * | 7/2004 | Wang et al. ..................... 707/5 |
| 6,892,226 B1 | * | 5/2005 | Tso et al. .................... 709/218 |
| 6,907,562 B1 | * | 6/2005 | Schuetze ................. 715/501.1 |
| 6,963,867 B2 | * | 11/2005 | Ford et al. ...................... 707/3 |
| 6,976,207 B1 | * | 12/2005 | Rujan et al. ................. 715/500 |
| 7,130,848 B2 | * | 10/2006 | Oosta ............................. 707/5 |
| 7,333,984 B2 | * | 2/2008 | Oosta ............................. 707/5 |
| 2002/0016741 A1 | | 2/2002 | Black et al. ................... 705/26 |
| 2002/0035573 A1 | | 3/2002 | Black et al. .............. 707/104.1 |
| 2002/0052894 A1 | * | 5/2002 | Bourdoncle et al. ......... 707/513 |
| 2002/0062302 A1 | * | 5/2002 | Oosta ............................. 707/1 |
| 2002/0123957 A1 | * | 9/2002 | Notarius et al. ............... 705/37 |
| 2002/0188694 A1 | * | 12/2002 | Yu .............................. 709/218 |
| 2002/0198979 A1 | * | 12/2002 | Yu .............................. 709/224 |
| 2003/0055831 A1 | * | 3/2003 | Ryan et al. .................. 707/100 |
| 2003/0126235 A1 | * | 7/2003 | Chandrasekar et al. ...... 709/220 |
| 2003/0195877 A1 | * | 10/2003 | Ford et al. ...................... 707/3 |
| 2005/0004889 A1 | * | 1/2005 | Bailey et al. ................... 707/1 |
| 2005/0165736 A1 | * | 7/2005 | Oosta ............................. 707/2 |
| 2005/0289140 A1 | * | 12/2005 | Ford et al. ...................... 707/5 |

OTHER PUBLICATIONS

Buchner, A.G. and M.D. Mulvenna "Discovering Internet Marketing Intelligence through Online Analytical Web Usage Mining", and SIGMOD Record, vol. 27, No. 4, pp. 54-61, Dec. 1998.*

Murray, D. and K. Durrell "Inferring Demographic Attributes of Anonymous Internet Users", Proceedings of the ACM Workshop on Web Usage Analysis and User Profiling, pp. 7-20, Aug. 1999.*

Chan, P.K. "Constructing Web User Profiles: A Non-Invasive Learning Approach", Proceedings of the ACM Workshop on Web Usage Analysis and User Profiling, pp. 39-55, Aug. 1999.*

Lee, J. et al. "Analysis and Visualization of Metrics for Online Merchandising", Proceedings of the ACM Workshop on Web Usage Analysis and User Profiling, pp. 126-141, Aug. 1999.*

Mobasher, B., R. Cooley and J. Srivastava "Automatic Personalization Based on Web Usage Mining", Technical Report TR-99010, Department of Computer Science, DePaul University, 1999.*

Pei, J., J. Han, B. Mortazavi-asl and H. Zhu "Mining Access Patterns Efficiently from Web Logs", Proceedings of the 4th Annua Pacific-Asia Conference on Knowledge Discovery and Data Mining (PAKDD'00), pp. 396-407, Apr. 17-20, 2000.*

Dutta, K., D. VanderMeer, A. Datta and K. Ramamritham "Discovering Critical Edge Sequences in E-Commerce Catalogs", Proceedings of the 3rd ACM Conference on Electronic Commerce, pp. 65-74, Oct. 14-17, 2001.*

Salton, G., J. Allan, C. Buckley and A. Singhal "Automatic Analysis, Theme Generation, and Summarization of Machine-Readable Texts", Science, vol. 264, Jun. 3, 1994, pp. 1421-1426.*

Kupiec, J., J. Pedersen and F. Chen "A Trainable Summarizer", Proceedings of SIGIR '95, Jun. 1995, pp. 68-73.*

Gibbs, M. "Liven up the LAN with Hot New Tools", LAN World, Feb. 12, 1996, p. 1.*

Chung, Y-M., W.M. Pottenger and B.R. Schatz "Automatic Subject Indexing Using an Associative Neural Network", Proceedings of Digital Libraries '98, Mar. 1998, pp. 59-68.*

Schuetze, H. "The Hypertext Concordance: A Better Back-of-the-Box Index", Proceedings of Computerm '98, 1998, pp. 101-104.*

G. Pascal Zachary, "The Godfather." Wired. Wired (unknown), Nov. 30, 1997.

Steve Ditlea, "Ted Nelson's Big Step." techreview.com. techreview.com (unknown), Oct. 31, 1998.

Webopedia, "hypertext," Webopedia, Webopedia (unknown) Sep. 1, 1996.

Webopedia, "hypermedia," Webopedia, Webopedia (unknown) Oct. 5, 1997.

Webopedia, "hyperlink," Webopedia, Webopedia (unknown) Feb. 25, 1997.

Webopedia, "hot link," Webopedia, Webopedia (unknown) Sep. 1, 1996.

L. Hillman, "Sum: Am. English Word Frequency Lists," Linguist List 7.583, Oct. 31, 1996.

Kostoff, R.N., et al., "Text Mining Using Database Tomography and Bibliometrics: A Review," http://www.onr.navy.mil/sci_tech/special/technowatch/textmine.htm.

J.M. Carroll, et al. "Computer Selection of Keywords Using Word-Frequency Analysis," http://www.vuw.ac.nz/lals/lals508/vrc.html, Washington, D.C., vol. 20, No. 3, pp. 227-233, Sep. 5, 1969.

"Trec and Tipster Experiments with Inquery", Callan et al., pp. 1-18 (1994).

"The Smart Automatic Document Retrieval System—An Illustration", Salton et al.; Communications of the ACM, pp. 391-398 (1965).

"A Vector Space Model for Automatic Indexing", Salton et al., Communications of the ACM, pp. 613-620 (1975).

"An Experimental Comparison of the Effectiveness of Computers and Humans as Search Intermediaries", Marcus, R.S., Journal of the American Society for Information Science, pp. 381-404 (1983).

"The Inquery Retrieval System", Callan et al., Database and Expert Systems Applications, pp. 78-83 (1992).

"Clustering Algorithms", Rasmussen, E; University of Pittsburgh, pp. 419-442.

"Internet Resource Discovery Services", Obraczka et al., University of Southern California, pp. 8-22 (1993).

"Dr-Link™ For Use on Netscape Navigator Quick Start Guide" Manning & Napier Information Services (1996).

"Distributed Indexing: A Scalable Mechanism for Distributed Information Retrieval", Danzig, P. et al., University of Southern California, pp. 220-229 (1991).

"The Effectiveness of Gloss for the Text Database Discovery Problem", Gravano, L. et al., ACM SIGMOD, pp. 126-137 (1994).

"Compound Document Processing System", Al-Hawamdeh, S. et al., IEEE, pp. 640-644 (1991).

"Growing Company Changes Data Entry—TextWare Outpoints Southern Computer Systems in Evaluation", Carol Curran, vol. 4; 3, Imaging World (1995).

"An Industrial Strength Document Warehouse Solution", Dataware Technologies, pp. 1-12 (1996).

"What OLE Is Really About", Brockschmidt, K., OLE Development, pp. 1-59, http://www.Microsoft.com/oledev/olecom/aboutole.htm, (1997).

"Hypertext: An Introduction and Survey" Conklin, J., IEEE, pp. 17-41 (1987).

"Chapter 1: Component Object Model Introduction", OLE Development, pp. 1-37, http://www.Microsoft.com/oledev/olecom/Ch01.htm (1997).

Voyager Stores and the World Wide Web, http://www.voyagerco.com.

"Common Questions Asked About ZyIMAGE", pp. 1-6, http://www.zylab.nl/Exe/ZyNET.exe, (1997).

"Powerful Imaging and Full Text Retrieval for Publishing On-Line", p. 1, http://zylab.n1/zylab/p2/zyimageweb.html (1996).

"The Full Text Retrieval & Publishing Experts", p. 1, http://www.irt.n1 (1996).

"UK Police put Criminals On-Line with New National Computer", Young, M., *Imaging Magazine* (1995).

"Instant Information Access", *TextWare Corporation* (1996).

"Tijuana Data Entry Shop Logs 500K Forms/Day", Spencer, H., *ImagingWorld*, vol. 4: 4, (1995).

"Needles in Document Haystacks", Spitzer, T., *Databases & Client/Server Solutions*, pp. 84-87 (1996).

"Text Retrieval Products & Services", http://www.textware.com/txtrtrvl.html.

"Organizations Worldwide Take Content Onto the Web with NetAnswer", *Dataware Technologies* (1996).

"Edit Trail", Ores, P., *PC Magazine*, pp. 133-138 (1995).

"The Forms Processing Paradigm Shift", Moore, A., *Imaging Magazine* (1995).

"NetAnswer™ Hosting Service", *Dataware Technologies, Inc.*

"NetAnswer™ Information Super Server for the World Wide Web", *Dataware Technologies, Inc.*

"TextWare's FormWare—Complex Data Capture That Puts Simplicity First" Harney, J., *Imaging Magazine* (1996).

"Fuzzy Searching", http://www.cris.com/-eti/fuzzyhtml (1996).

"Infoseek Adds New Search Features", Sullivan, D., SearchEngineWatch.com, http://searchenginewatch.com/sereport/article.php/2167241, pp. 1-3 (Jun. 2, 1999).

"AltaVista Adds Related Search Prompter", Sullivan, D., SearchEngineWatch.com, http://searchenginewatch.com/sereport/article.php/2166801, pp. 1-2 (Nov. 4, 1998).

"AltaVista Launches Prisma", *Pandia*, pp. 1-6, http://www.pandia.com/sw-2002/22-altavista.htmi (Jul. 2, 2002).

"Okapi at Trec-3", Robertson et al., *Centre for Interactive Systems Research of Information Science City University*, pp. 109-230.

"The Collection Fusion Problem", Voorhees E., et al., *Siemens Corporate Research, Inc.* pp. 95-104.

"Efficient Probabilistic Inference for Text Retrieval", Turtle, H. et al, *Intelligent Text and Image Handling*, pp. 644-661 (1991).

"Evaluation of an Inference Network-Based Retrieval Model", Turtle, H., *acm Transactions on Information Systems*, pp. 187-222, vol. 9; 3 (1991).

"Searching Far and Wide: The Powerful Document Retrieval Software of PLS", Banet, B., *Seybold Report on Desktop Publishing*, vol. 10; 8 (Apr. 22, 1996).

"Search Engine Reviews", Sullivan, D., SearchEngineWatch.com, pp. 1-15, http://www.searchenginewatch.com/resources/article.php/2156581 (Nov. 15, 2002).

"How Search Engines Work", Sullivan, D., SearchEngineWatch.com, pp. 1-3, http://www.searchenginewatch.com/resources/article.php/2168031 (Nov. 14, 2002).

"Search Engines: Court Cases, Lawsuits and Legal Issues", Sullivan, D., SearchEngineWatch.com, pp. 1-16, http://www.searchenginewatch.com/resources/article.php/2156541 (May 15, 2003).

"About Search Engines", *Leap Publications*, http://leapint.dircon.co.uk/about_search_engines.htm (Jul. 8, 2003).

"Search Engine Page Ranking", Watson, G., http://256.com/gray/docs/search.html, pp. 1-5 (2000).

"Free Full Text: FindArticles and MagPortal" Notess, G. http://www.infotoday.com/online/jul02/OnTheNet.htm, pp. 1-4 (Jul./Aug. 2002).

"Betting on the Web Search, Inktomi Unveils Upgrades", Haley, C., http://www.internetnews.com/IAR/article.php/1545671, pp. 1-4 (Nov. 2, 2002).

"Internet Brand Leaders Dominate Low Price Competitors, MIT Study Shows", http://www.globaltechnoscan.com/28thJune-4thJuly/internet_brand.htm, pp. 1-3 (Jul. 8, 2003).

"Our Amazon.com Policy", http://monkeyfist.com/profile/amazon (Jul. 8, 2003).

"Where Are They Now? Search Engines We've Known & Loved", Sullivan, D., http://www.searchenginewatch.com/sereport/article.php/2175241, pp. 1-4 (Mar. 4, 2003).

"Choosing", Boedeker, T. et al., *Law Office Computing* pp. 50-55 (1995).

"Boolean Searching" http://www.cris.com/-eti/Boolean.html (1996).

"Agent Searching" http://www.cris.com/-eti/agent.html (1996).

"An Essential Ingredient: Post Recognition Processing", Bish, R., *Imaging World* (1996).

"Forms Processing Products & Services", http://www.textware.com/formspro.html, pp. 1-3.

"Your Forms Processing Solution", *FormWare for Windows 95/NT* (1995).

"Introduction to Dataware's CD-ROM Product and Services", pp. 1-12, http://www.dataware.com/site/prodserv/cdintro.htm (Nov. 12, 1996).

"Issues in the Design of Hypermedia Systems", Halasz, F. (1990).

"Dataware Lands $6.6M GPO Pact", Moore J., *Marketplace*, pp. 84, 86 (1995).

"Personal Text-Retrieval Software Works with Calera's WordScan", ZyLAB, *PCMagazine* p. 68 (Jan. 24, 1995).

"Retrieving Text on the Net", ZyLAB, *PC Magazine*, p. 61, (Nov. 21, 1995).

"Hip Products", ZyLAB Europe BV.—Products, p. 1, http://www.zylab.n1/zylab/p2/prods.html (Dec. 29, 1997).

"HyperWriter for Windows", *PC Magazine*, pp. 140-142 (Feb. 7, 1995).

Product Summary of MicroRetrieval Corp., Text and image search/retrieval program, Software product specification, p. 1.

Jupiterdirect—Search Engines, p. 1, http://www.jupiterdirect.com/bin/container.p1/897 (Jul. 8, 2003).

\* cited by examiner

```xml
<newsstories>
<newsstory>
 <newstitle>Lazio Accuses Clinton</newstitle>
 <newsbody>Hillary Rodham Clinton spent some time today blaming
Palestinian leader Yasser Arafat for the breakdown in the recent Middle
East peace talks. Meanwhile her Senate opponent, Rick Lazio, accused
her of flip-flopping on moving the U-S Embassy in Israel to Jerusalem.
Lazio, courting the Jewish vote in the Hamptons, noted that the first
lady's call to relocate the embassy from Tel Aviv comes just nine
months after she told an Orthodox Jewish group that she could not
support an immediate move of the facility. For the first time in her
Senate bid, Clinton today set a year-end deadline for the American
Embassy to move to Jerusalem. In Decemeber, in a meeting with the Union
of Orthodox Jewish Congregations of America, she declined to make such
a commitment. As Clinton seeks New York's critical Jewish vote, which
represents about 12 percent of the state's electorate, she appears to
be taking a page out of her husband's political book. She spoke the
same day as President Clinton, in a front page story in The New York
Times, said the United States would consider moving its embassy from
Tel Aviv to Jerusalem. His wife took a stronger position Saturday,
declaring a timetable for such a decision.</newsbody>
 <newsource>WABC</newsource>
 <newsauthor>Michael Bartlett</newsauthor>
 <newsdateline>New York</newsdateline>

<newskeys>
 <keyword>embassy</keyword>
 <keyword>Jewish</keyword>
 <keyword>union</keyword>
 <keyword>book</keyword>
 <keyword>president</keyword>
 <keyword>America</keyword>
 <keyword>Israel</keyword>
 <keyword>peace</keyword>
 <keyword>Palestine</keyword>
 <keyword>politics</keyword>

<propernames>
 <nametext>Hillary Rodham Clinton</nametext>
 <nametext>American Embassy</nametext>
 <nametext>Orthodox Jewish</nametext>
 <nametext>Orthodox Jewish Congregations</nametext>
 <nametext>Jewish</nametext>
 <nametext>Clinton</nametext>
 <nametext>U-S Embassy</nametext>
 <nametext>Yasser Arafat</nametext>
 <nametext>Middle East</nametext>
 <nametext>United States</nametext>
 <nametext>New York</nametext>
 <nametext>Senate</nametext>
 <nametext>Tel Aviv</nametext>
 <nametext>Israel</nametext>
 <nametext>Palestinian</nametext>
 <nametext>Meanwhile</nametext>
 <nametext>Union</nametext>
```

FIG. 1 http://client.etronica.com/xweb/usagelog.dll?cl=12345678&ts=0&uid=5742

This is an example of the complete string of characters which compose the consumer behavior data sent upstream to the datamining system.

http://client.etronica.com/xweb/usagelog.dll is the target URL, where the database software used to collect, manage and analyze the consumer behavior would be, and "cl=12345678&ts=0&uid=5742"

is a string incorporating the consumer behavior data parameters being sent to the datamining system.

The unique client ID is indicated by cl=12345678

The class of behavioral event is indicated by ts=0

0= Indicates the simple selection of the article in question
1= Indicates a Hotwording event
2= Indicates a user query event
3= Indicates a metatag-enhanced commerce event
4= Indicates an automated Boolean ANDed query event
5 and beyond = other classes of events yet to be determined The metatagged keywords <keyword>embassy</keyword>
  <keyword>Jewish</keyword>
  <keyword>union</keyword>
  <keyword>book</keyword>
  <keyword>president</keyword>
  <keyword>America</keyword>
  <keyword>Israel</keyword>
  <keyword>peace</keyword>
  <keyword>Palestine</keyword>
  <keyword>politics</keyword> are incorporated by reference to the unique article ID number (uid=5742) for the article to which they are tagged, rather than being explicitly noted, in order to reduce the amount of data that needs be sent upstream.

For Hotwording, the data string might look like this:

http://client.etronica.com/xweb/usagelog.dll?cl=12345678&ts=1&query=hillary clinton where "query=Hillary Clinton" is added to indicate the selection of "Hillary Clinton" as the hotword.

FIG. 3

Keyword Summary Report for : 6/15/2001

Friday, June 15, 2001

Reports Home
Previous Day(6/14/01) Next Day(6/16/01)

| Rank | Keyword | Freq | Yesterday Rank | Yesterday Freq | Article |
|------|---------|------|----------------|----------------|---------|
| 1 | Education | 4 | - | - | intelligence test |
| 2 | Film | 4 | - | - | Sellers, Peter 1925-1980 |
| 3 | Battle | 3 | - | - | Avalon |
| 4 | England | 3 | - | - | Avalon |
| 5 | Land | 3 | - | - | Avalon |
| 6 | mythology | 3 | - | - | Avalon |
| 7 | fiction | 3 | - | - | Danilo Kis |
| 8 | Slavic | 3 | - | - | Danilo Kis |
| 9 | chemistry | 3 | - | - | glass |
| 10 | Engineering | 3 | - | - | glass |

FIG. 5

| TODAY 6 P.M. | TODAY NOON | YESTERDAY 11 P.M. | PAGE VIEWS | AREA OF INTEREST | <--- TOP RELATED STORIES ---> | | |
|---|---|---|---|---|---|---|---|
| 1 | 3 | 3 | 1469 | SAFETY | FIRESTONE OFFICIALS HAD PRIOR KNOWLEDGE | BRIDGESTONE CHIEF APOLOGIZES | GULF AIRPLANE DIDN'T SLOW BEFORE CRASH |
| 2 | 1 | 1 | 1431 | PRESIDENT | GORE PLEDGES RAINY DAY SURPLUS | BUSH UNVEILS $158 BILLION DRUG PLAN | LAZIO ACCUSES CLINTON |
| 3 | 2 | 4 | 1062 | CHILDREN | TEACHERS THREATEN STRIKE AS CHILDREN RETURN TO SCHOOL | BEST COMPANIES FOR WORKING MOTHERS | LIEBERMAN DEFENDS RELIGIOUS TALK |
| 4 | 4 | 6 | 1055 | TELEVISION | SURVIVOR STARS FIELD OFFERS | BANK ROBBERY SUSPECT SURRENDERS ON LIVE TV | BUSH PRESSES ATTACK ON GORE |
| 5 | 7 | 8 | 1006 | ECONOMY | GORE PLEDGES RAINY DAY SURPLUS | BEST COMPANIES FOR WORKING MOTHERS | TECH STOCKS TUMBLE |
| 6 | 6 | 5 | 1002 | INTERNET | MP3 RULING SENDS IMPORTANT MESSAGE, JUDGES SAYS | TECH STOCKS TUMBLE | |
| 7 | 5 | 2 | 981 | JEWISH | LIEBERMAN DEFENDS RELIGIOUS TALK | POPE DEFENDS BEATIFICATION | LAZIO ACCUSES CLINTON |

FIG. 6

METATAG-BASED DATAMINING

This application is a continuation-in-part of our application Ser. No. 09/630,227 filed Aug. 1, 2000 and our application Ser. No. 09/703,006 filed Oct. 31, 2000 and our application Ser. No. 09/738,471 filed Dec. 15, 2000.

FIELD OF THE INVENTION

The invention relates to providing a system for sensing and responding to consumer behavior as evidenced by the consumer's selection and consumption of content, products or services over open or closed digital networks, in forms ranging from simple text to complex multimedia.

BACKGROUND OF THE INVENTION

The Problem

Open network systems like the Internet and closed network systems such as those operated by cable television and telephone companies deliver trillions of words and millions of hours of digitized audio and video to billions of computer and television screens. Systems exist which survey traffic on these systems to determine the behavior of consumers. Some systems exist which will identify consumer behavior on the basis of the selection of a particular web page or a particular television program. No system exists however, to analyze and/or survey statistics revealing the underlying interests (psychographic or psycholinguistic behavior) of those persons selecting particular content and portions of that content, to recommend related products, services and content that can be consumed or purchased by the consumer. It would be highly beneficial to create markets on a near real-time basis for those products and services of interest to persons that are already recognized to be interested in a particular related subject.

Origins of the Solution

During and immediately following World War II, large scale computing was first applied to the task of managing the explosion of information. Vannevar Bush, FDR's technology czar, laid out the problem in an article in the Atlantic Monthly called 'As We May Think'(see and imagined a solution —called the MEMEX—which was the precursor to the massively indexed databases and search engines in wide proliferation today. At roughly the same time, Claude Shannon of MIT and Bell Labs (Bush and Shannon knew each other and worked together in the design and deployment of the first computers) laid out 'Information Theory'(see and the conceptual framework for digital noise reduction, based on the fundamental precepts of Boolean logic.

Though cloaked in secrecy for decades, the National Security Agency (NSA) has made extensive use of massive scale computing to perform traffic analysis on electronic/digital communications (telephony, telegraphy, RTTY, fax, email, etc.). The standard methodologies employ two different but complementary approaches, forecast by Bush and Shannon: filtering based on Boolean search techniques, and word frequency analysis. The first methodology takes impossibly large arrays of data and produces manageable subsets relevant to the search criteria ('associative trails' as imagined with Bush's MEMEX: "Wholly new forms of encyclopedias will appear, ready made with a mesh of associative trails running through them"), the second methodology identifies pervasive themes and/or subject matter within these manageable subsets (in effect, road maps). The resulting analysis can then be 'fed back' (feedback is a key concept in Information Theory) into the search process in order to refine and more precisely target the searches.

Massive computing and associated databasing began to impact the internal operations of big business and the military in the 1950's, somewhat lagging behind the intelligence agencies. In the 1960's, massive computing enabled large scale electronic transaction processing and billing, with consumers benefiting through the arrival of credit cards. For business, the resulting transaction databases enabled datamining for customer behavior profiles, and led to consumer targeting through direct mail and telemarketing. Using set-top boxes and diaries, Nielsen and other firms sought to sample consumer behaviors, and used computer-driven statistical analysis and inference to characterize consumer behavioral trends.

In the early 1980's massive computing became sufficiently inexpensive for academics to employ. Then, the first word frequency analysis projects were undertaken on very large samples of published English language prose, and by the late 1980's the results were commonly available in public literature.

In the early 1990's, the Office of Naval Research (ONR) embellished word frequency analysis techniques in order to automate the review of international science and technology literature, to create comprehensive conceptual roadmaps through the material.

The idea was to use machine analysis to figure out what the Russians, and other adversaries and allies were doing in science and technology by using computational linguistics on a closed system of published literature. The result is a technology called Database Tomography (DT), which automates
  the retrieval of relevant documents
  the identification of technical infrastructure (who is citing who, etc.)
  the identification of technical themes and relationships
  the discovery of non-obvious underlying themes in the literature In the mid-nineties a further embellishment of word frequency analysis evolved in the academic/technology community, called latent semantic indexing (LSI). LSI seeks to identify the underlying concepts in documents, and then draw conclusions with regards the similarity/relevance to other documents by comparison of the documents thematic matrices.

In the late 1990's, largely in response to the demands for improved search and ad targeting over the Internet, a number of search enhancement and content analysis techniques were in development.

Some of these systems required manual intervention. In one instance, Yahoo employed a large numbers of ontologists to develop a knowledge classification system with upwards of 30,000 nodes, in order to assist the search for related material. In another, a firm called Gotuit developed systems for adding additional data (metadata) to streaming audio and video that allowed the material to be 'sliced and diced', thus enabling search for specific segments.

Some of these systems were automatic. In one instance, Rulespace sought to duplicate Yahoo's ontological approach in an automated fashion. Autonomy, and other like firms, sought to automatically classify content according to extent advertising categories. Predictive Networks, and other like firms, sought to classify consumer behavior patterns by tracking consumer's use of clicks and keystrokes while using the Internet.

The system of this invention, (called the Etronica system) directly tracks what consumers are interested in, by sensing their search behavior.

Component Methodologies of the Etronica System

Word frequency analysis on large corpi of English language prose to identify a base keyword set.

Word frequency analysis on smaller 'special' corpi of English language prose (eg. An Electronic Program Guide used in a cable television system, or a law citation database) in order to identify statistically frequent, and hence special 'terms of art' for inclusion as extensions to the base keyword set.

Automated assignment (metatagging) of keywords, drawn from a master keyword set, to individual documents, or records within a database.

Exploitation of the 'tagged' keywords to form effective Boolean ANDed searches.

Exploitation of the 'tagged' keywords as indicators of consumer's territories of interest.

Signaling consumer interests over a network for centralized accumulation in a datamining system for traffic analysis.

Exploitation of statistically significant consumer patterns of interest for optimization of ad and merchandise sales and delivery of relevant content.

For example, while searching the Internet for an article on basketball, various basketball-related television programs or video-on-demand (pay-per-view) movies could be recommended, as well as various products that could be suggested on the screen for purchase, such as sports supplies, sports clothing and books and magazines on the subject of basketball. If it could be determined that the searcher was particularly interested in professional basketball, the products suggested could be narrowed to be more relevant to that interest. Alternatively., while watching a broadcast television program like WEST WING, various related politically-oriented television broadcasts, in dramatic, news and documentary genres (for example a documentary on the Secret Service), could be recommended, as well as related Pay Per View motion pictures (for example, a film such as *In The Line Of Fire*, through Video on Demand services), as well as an array of related products and services, and related websites, might be recommended. Further, psychographically related products and services, related by coincident behavior rather than common themes of interest, might be incorporated into the recommendations.

Superiorities of the Invention (the Etronica System)

1) It is founded on a broad model of human interests and activities, as empirically indicated by the keyword set derived from word frequency analysis of massive, non-specialized corpi of English language prose. The document-specific analysis of LSI and DT limits the reach of the analysis to the system of documents reviewed, and suffers from increasing complexity as documents are added to the system. The advertising specific approach of Autonomy and others limits the analysis to a crude breakdown of advertising categories.

2) Unlike the numbers-based LSI (and other Neural Net systems), the Etronica system uses a set of tokens based on keywords whose meaning is clear, and easily understood and interpreted by humans.

3) Unlike computationally intensive systems like LSI (and other Neural Net systems), the Etronica system is fast, and computationally highly efficient. The creation of the keyword set is already done, and the keyword matching to content is principally based on table lookup techniques. The computational requirements grow in a flat, symmetric fashion with the number and length of the documents or records, rather than exponentially, as with LSI, and other matrix-analysis based systems.

4) Because virtually all digitally searchable bodies of content can be manipulated using Boolean search operators (AND, OR, NOT), the exploitation of the metatagged keywords in the Etronica system to form Boolean ANDed queries is naturally compatible with the de facto international API (application program interface) for search.

5) Because the Etronica system is founded on an empirically valid keyword set (see 1), tuning the keyword set to a new specialized corpus simply requires the identification of an extension to the base set of keywords, rather than the complete reformation of the set (as is required by most metatagging systems). This is quickly and easily accomplished by a word frequency analysis on the specialized corpus, and comparison of the results to the existing Etronica keyword set to determine the significant differences. This process is, in essence, a feedback loop for signal correction.

6) Because the Etronica system tracks consumer interest, rather than their transactions (as in the case of Amazon's metatagging system, and many advertising-driven systems), no invasion of individual privacy as a result of the association of individual information with sensing data is either necessary or inevitable in the datamining/traffic analysis process.

7) Because the Etronica system exploits only most commonly used words in the keyword set as second operands in Boolean ANDed queries and analysis, the synonymy problem suffered by most computation linguistics problems (including DT and LSI) is attenuated.

8) Because the Etronica system exploits keywords with non-ambiguous meanings ('movie', as opposed to 'film'), the polysemy problem suffered by most computational linguistics systems (including DT and LSI) is attenuated.

9) Because the Etronica system is based on constant Traffic Analysis, rather than sampling and statistical inference (as practiced by Nielsen, Mediametrix and other consumer sensing systems), and senses human interests, rather than mouseclicks and keystrokes, the resulting profiling of behavior is far more accurate.

10) Because the Etronica system exploits a 'flat' set of keywords (where no words holds a parent-child hierarchical relationship to another, nor is any specific value-based weighting give one keyword over another), rather than the hierarchical systems employed by Yahoo and Rulespace, and derived by DT and LSI, the statistical occurrence of Etronica keywords can be viewed in a combinatorial fashion. In effect, two or more keywords co-occurring in a statistically significant fashion will describe a territory of consumer interest in a more precise fashion, because they have been Boolean ANDed together.

11) Because the distribution of the Etronica keywords is consistent, and the set of keywords is limited, the storage and transmission of consumer behavior data equipped with a payload of Etronica keywords requires a very small amount of data to be transferred, unlike most other consumer remote-sensing techniques.

OBJECTS OF THE INVENTION

It is an object of this invention to determine the interests of users of closed and open networks by enhancing the content they will select and consume through metatagging, sensing their behavior as they navigate through complex systems of metatagged information and content, recording (either locally on a mass-storage device, or remotely in an aggregated datamining operation) the raw evidence of their behavior and then performing traffic analysis on the raw data to determine statistically significant patterns of behavior which can be used as the basis for 1) improving and optimizing graphic user interfaces (GUI) on computer, television and other kinds of screen displays, 2) making recommendations for related content, products and services and 3) enabling value-based sales of advertising, sponsorships and merchandising opportunities based on traffic analysis-based empirical evidence as to user interests and behavior.

SUMMARY OF THE INVENTION

The METATAG-BASED DATAMINING of this invention uses a manual or automated keyword tagging system to determine content, products and services that share common themes of interest for users. As the directory which references content, products and services is being prepared for publishing on a network, each record is tagged with one or more pre-selected keywords either manually or using an automated tagging process as described in our parent patent applications on "Hotwording" (Ser. No. 09/630,227), "Brilliant Queries" (Ser. No. 09/703,006) and "Targeted E-commerce" (Ser. No. 09/738,471). These keywords are attached (metatagged) to individual records in reference directories of television and cable program information (Electronic Program Guides or EPGs), film directories (used for Video-on-Demand services), and any and all reference directories that might include news, weather, sports, financial and other kinds of special or encyclopedic reference information.

As users navigate through the metatagged content from the directories, small efficient records of their navigation behavior (enhanced with metatagged keywords that reveal what the user is interested in) are sent for storage in databases (either locally on the PC, mobile device, set-top box or other form of connected appliance, or in a central mass storage repository for datamining (often referred to as a datacube), or both.

Different classes of user navigation events can be recorded. For example, the simple selection of a metatagged news article would produce a traffic analysis record exposing the user's selection of a specific piece of content, and the 'angles of interest' as betrayed by the metatagged keywords. The title or subject of the article, when combined with the metatagged keywords, allows for efficient contextualization.

Contextualization through tagging of content occurs because, whether explicit or implicit, all content must have a context to allow for clear understanding. For example, an article titled *Blackbird* might be about a bird, or a song by the Beatles, or a sophisticated reconnaissance airplane. The 'metatagging' of the keyword 'reconnaissance' to the article in question would leave little or no ambiguity as to the subject matter.

Since the goal of this technology is to locate specific and well-targeted communities of users who share common interests and behaviors, it is important to note that the analysis of the traffic in a given network must find the logical intersection of all content, product or service selections that match the context of the user's original selection and all possible content, product or service selections that are a probable match for the user's interests and behavior.

In another example, the use of a 'Hot Word' as described in our parent patent application, within a metatagged article (see our patent application for "Hotwording Query System"), would produce a traffic analysis record detailing the user's impulsive selection of a subject of interest (effectively, the first operand in a Boolean ANDed specification of the user's territory of interest) associated with the keywords metatagged to the article (effectively, an array of second operands in a Boolean ANDed specification of the user's territory of interest).

In another example, the use of a "Brilliant Query" as described in our parent patent application, associated with a metatagged article (see patent application for "Brilliant Query"), would produce a traffic analysis record detailing the user's analytically driven selection of a recommended search (effectively a Boolean NOT specification of the user's territory of interest by virtue of the fact of the exclusion of the other recommended queries, each of which exploits one of the metatagged keywords as a second operand in a Boolean ANDed search, and thus represents a specific angle of interest).

In another example, the use of a "Targeted E-Commerce" offer as described in our parent patent application, associated with a metatagged article (see patent application for "Targeted E-Commerce"), would produce a traffic analysis record detailing the user's selection of a recommended product or service (effectively, the product or service serving as the first operand in a Boolean ANDed specification of the user's territory of interest) associated with the keywords metatagged to the article and shared in the product or service record in the directory (effectively, an array of second operands in a Boolean ANDed specification of the user's territory of interest), and betraying the user's behavior and interests when he or she is prepared to consider an economic transaction.

Content, products or services are associated with one or more keywords, which are manually or automatically selected. An example of keywords associated with, for instance, "Basketball", would be "clothing" and/or "celebrity". An example of keywords associated with, for instance, an episode of the television show "WEST WING", would be "politics" and/or "president" and/or "assassination". All example of keywords associated with, for instance, a news article on the SR-71 'Blackbird' airplane, would be "aviation" and/or "reconnaissance".

All keywords are listed in a keyword table. Recommendations are made by performing a statistical frequency analysis of keyword occurrence in the datamined records of user navigation events (either differentiated by class of event, or taken in aggregate) and then comparison to the metatagged keyword 'signatures' of individual articles of content in the directory of content, products and services to determine direct relevance (a precise match), or close relevance (a close match when multiple keywords are considered). As discussed in our "Brilliant Query" application, more definitive results will be obtained if keyword clusters, such as a doublet (a two word combination) or a triplet (three word combination) are analyzed, as they are far more revealing than a single word or general content category.

The recommendation of content, products or services, is a simple process of filtering the total array of alternatives in order to limit the display to only those associated with specific keywords or multiple keyword clusters. The filtering is accomplished through conventional Boolean AND and NOT operations on a database of user navigation records, where every record is fortified by metatagged keywords.

Special 'pilot' keywords can be added to select records, in order to flag special demographic or psychographic characteristics in the process of datamining. For example, a program guide entry for the television program "WEST WING" might be tagged with a special 'pilot' keyword to identify "WEST WING" watchers, which will reflect the unique demographics of the people who watch "WEST WING". Datamining would reveal what other content, products and services people who watch "West Wing" are inclined to be interested in, based on statistical analysis of coincident behavior. Marketers generally refer to these kinds of content, products and behavior as 'adjacent'.

Selection for recommendation can be done statically as a preprocess on reference directories, thus enabling the caching of recommendations on either the host or the local device or the selection for recommendation can be performed on the host or local device dynamically.

With the static publishing model, the selection for recommendation is done at the time the products, content or services are submitted for publishing (normally in a closed network, where the network operator has full control over what is going to be published) in the directory and the recommendations are fully integrated with the hosted reference directory. This model serves the passive user.

The dynamic publishing model relies on a reference directory that is running live on the server and gateway interface technology to query the reference directory and produce recommendations as the user navigates through each new alternative selected from the total array of content, products and services. This model allows for recommendations that are instantly updated as the user actively searches for new alternatives.

If the reference directory has been enhanced via the above-described system of metatagging, then the match can be undertaken via sophisticated statistical matching techniques. This would be the case in a closed network, like a cable television system, where the system operator controlled all alternatives.

If the reference directory is maintained without such enhancement, but is capable of responding to Boolean ANDed queries (as would be the case with an open network like the Internet, where no individual or institution controls the array of alternatives, but search engines provide a directory for access to all alternatives) then the matching can be accomplished through the real-time metatagging and automated submission of Boolean ANDed queries derived from the metatagging process, as described in our "Brilliant Query" application.

There will be cases where the number of recommended alternatives displayed on a given screen needs to be limited. When the number of alternatives matching the keywords for a given screen exceeds this limit, there are one or more criteria for determining the alternatives that should be displayed. First, all alternatives that are associated with all keywords are selected as a set. One or more of the following optional criteria then orders the recommendation list:

1) Date of listing (how new or time-sensitive is the content, product or service).
2) Keyword weighting (a content, product or service that matches the keyword that most frequently appears in the source article from the directory will be displayed before a content, product or service that matches a lower frequency keyword).

The list of suggested products and/or services is then limited to a system operator-specified number of alternatives based on the screen design preferences.

Metatagged keywords are simply a collection of words, generated automatically or manually, that are deemed to be indicative of the topic matter or one of the topics for a given directory selection. Metatagged keywords are determined by comparison of a pre-determined list of keywords to the text of the directory selection. If the directory selection contains one or more of the keywords, or an appropriate synonym, then that keyword is associated with that text body and potentially used for the metatag-enhanced datamining. Keywords may also be determined by statistical word frequency analysis of the text, with or without manual selection and addition of synonyms.

Keywords are generated by automatic or manual statistical and empirical analysis of the body of content to be enhanced or a comparable body of content. The keyword list for a given content source is generated through the use of word frequency analysis, stopword removal and finally, manual selection using empirical testing of the results generated by a given potential keyword. Based on experience, a solid keyword list usually runs between 250 and 1000 words and phrases, which are chosen by the system designer. The keyword set can be periodically improved and optimized by word frequency analysis of large bodies of text, which represent the appropriate territories of interest.

Also, the keyword set can be manually tuned through the use of a thesaurus feature whereby a given keyword can be associated with one or more synonyms that would indicate the use of the keyword whenever one or more of the synonyms appear in the body of text to be enhanced.

Marketers use datamining to identify which clusters of consumers perform at above or below average rates for their content, products and services, by responding to their offers. By identifying the consumers that are navigating to specific content, products and/or services on a network by their underlying interests, marketers will be able to prove they can have a "care for me" relationship and a "you know who I am" relationship with the consumer.

The statistical analysis of user navigation data fortified with metatagged keywords, whether conducted locally in a specific 'client' device or at a global collection point for all users (in the datacube) will identify frequently occurring patterns of behavior.

By definition, high frequency behavior means valuable clusters of consumers. Once identified, system operators will act in three territories to exploit the traffic analysis.

1) GUI: Knowing what people are interested in will allow system operators to redesign their graphic user interfaces (GUI) to put the content, products and services most likely to be of interest 'up front', the most important news stories at the top of the page, the most interesting television shows at the beginning of the program guide, the most attractive merchandising or promotional offers in the context of the video-on-demand offering of greatest interest to the related audience cluster. All these are examples of the optimization of GUI in response to the results of the metatag-driven traffic analysis.
2) Recommendation Engine: Where a vast array of alternative selections are available, metatag-driven data analysis will allow similar content, products and services to be recommended to consumer clusters.
3) Value-based sales: System operators, equipped with empirical evidence of what content, products and services around which consumers of common interests are clustering, will be able to value their advertising space and price their sponsorships on the basis of constantly sensed consumer behavior data.

Thorough and constant traffic analysis on a global basis will yield highly precise descriptions of commonly recurring consumer behavior patterns. These patterns will function like a well-researched map, and when compared to the less robust data analysis (limited because the local data is limited) performed in local (client) devices, like PCs and set-top boxes, will allow the recognition of less-well defined local behavior patterns, thus enabling 'best guess' GUI adjustments, recommendations and targeted advertising and sponsorships.

BRIEF DESCRIPTION OF THE DRAWINGS

FIG. 1 is a depiction of a news story embellished with metatagged keywords;

FIG. 3 shows examples of five different HTML commands which are embedded in the news story web page of FIG. 2, in order to enable the signaling of consumer navigation behavior 'upstream' to a datamining system;

FIG. 5 is a depiction of a computer screen showing a real-time Internet delivered daily report;

FIG. 6 is a sample of a printed summary report based on traffic analysis data;

DETAILED DESCRIPTION OF THE PREFERRED EMBODIMENT

FIG. 1 is a news story entitled "Lazio Accuses Clinton". embellished with metatagged keywords associated with the article. The keywords have been chosen by the use of word frequency analysis and keyword lists, as described in our parent patent applications.

Figure 2:
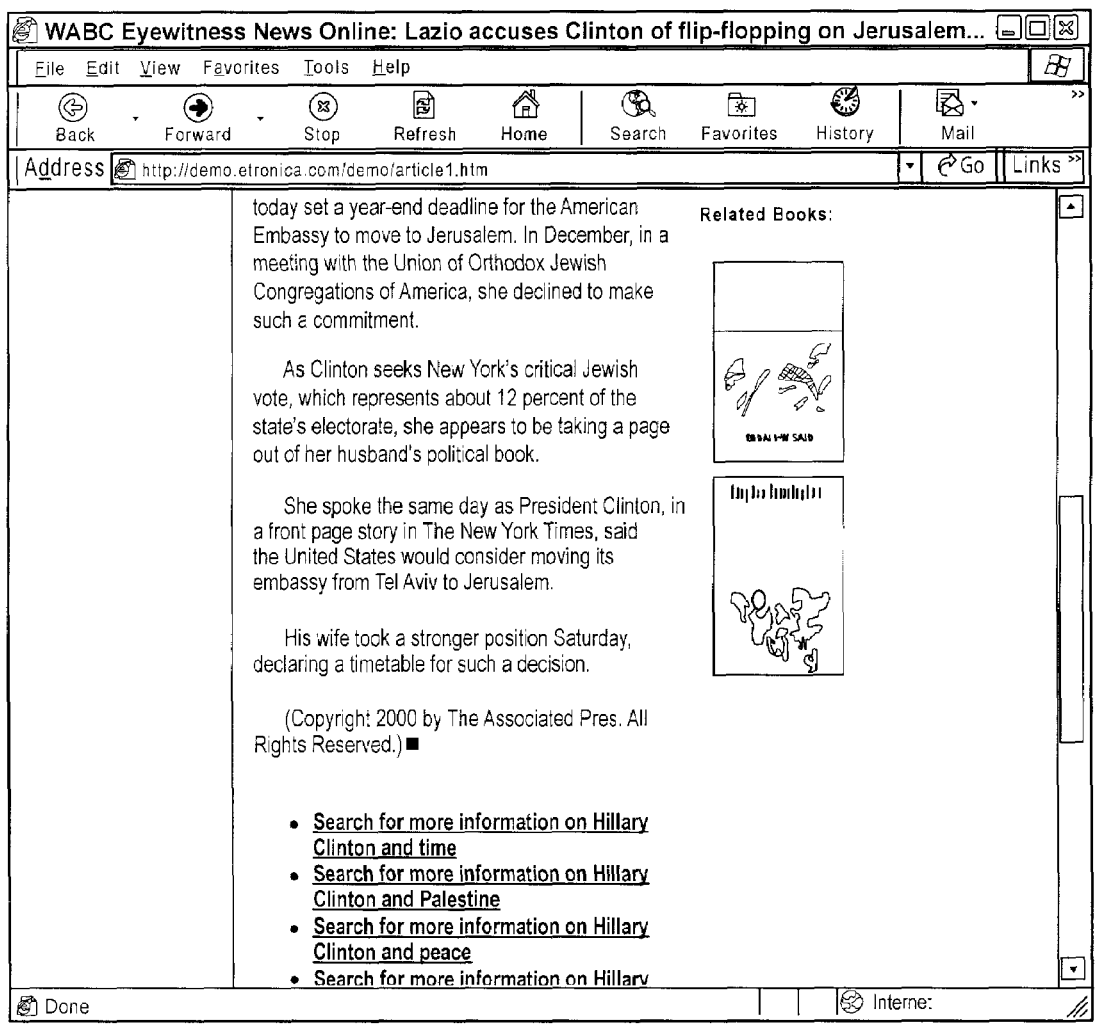
FIG. 2 is a depiction of a computer screen showing a metatagged news story, for which "Brilliant Queries" and "Targeted e-commerce" offers have been created, by exploitation of the keyword metatagging.

FIG. 2 is a depiction of the same metatagged news story. for which "Brilliant Queries" and "Targeted e-commerce", offers have been created by exploitation of the keyword metatagging.

FIG. 3 shows examples of five different HTML commands which would be embedded in the news story web page of FIG. 2, in order to enable the signaling of consumer navigation behavior 'upstream' to a datamining system which tracks consumer data.

Figure 4:
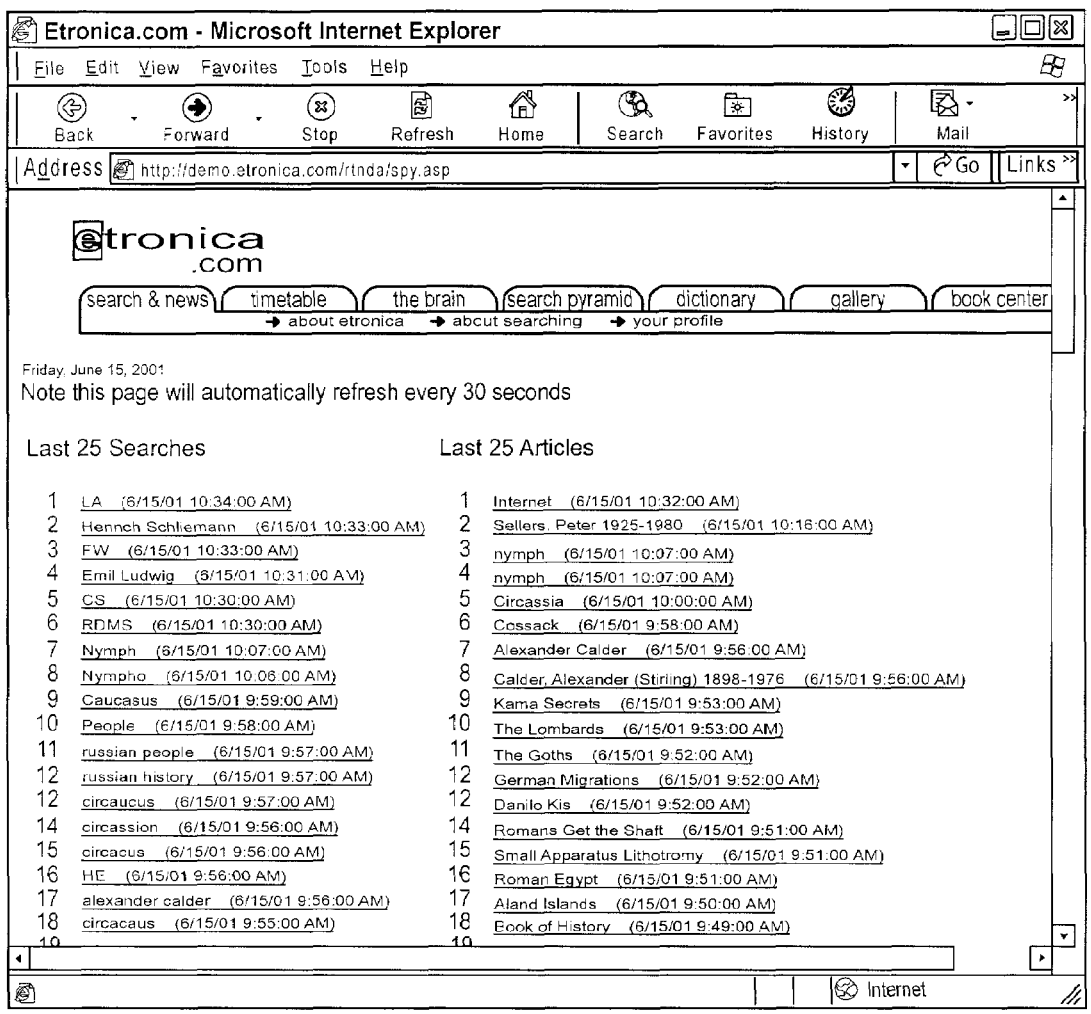
FIG. 4 is a depiction of a computer screen showing a spot report on searches made in Encyclopedia Electronica.

FIG. 4 depicts a spot report on searches made in Encyclopedia Electronica, where every article has been metatagged, and consumer search behavior is cross-correlated to the metatagged keywords associated with every article, hence revealing statistically significant consumer interests through traffic analysis.

FIG. 5 depicts a real-time internet-delivered daily report based on data derived from datamining data derived from Encyclopedia Electronica, exposing the frequency of occurrence of metatagged keywords.

FIG. 6 shows a sample of a printed summary report based on traffic analysis data. Shown are the rankings of areas of interest listed in order of pages having been viewed by users (at the latest time), with the two previous times also disclosed. Also shown are the top related stories for each area of interest.

Figure 7:
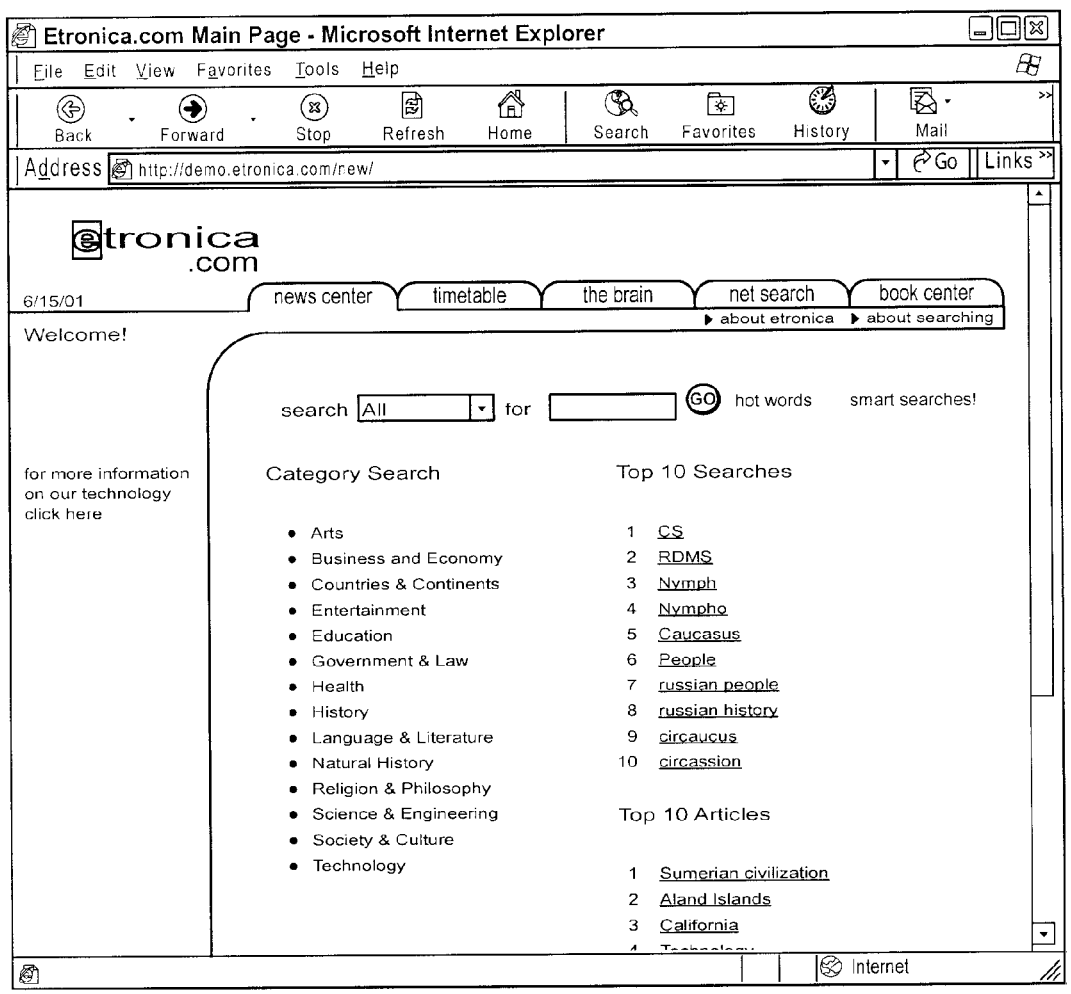
FIG. 7 is a depiction of a computer screen showing a Graphic User Interface (GUI); and, FIG. 8 is a depiction of a computer screen showing an e-commerce offer, optimized and targeted on the basis of traffic analysis data.

FIG. 7 depicts a screen page of a Graphic User Interface (GUI), which is constantly optimized on the basis of traffic analysis data. The 'Top Ten' searches, and the 'Top Ten' articles are chosen and sorted on the basis of traffic analysis data, i.e. those stories and those articles, which prove to be of the greatest interest to consumers.

Figure 8:
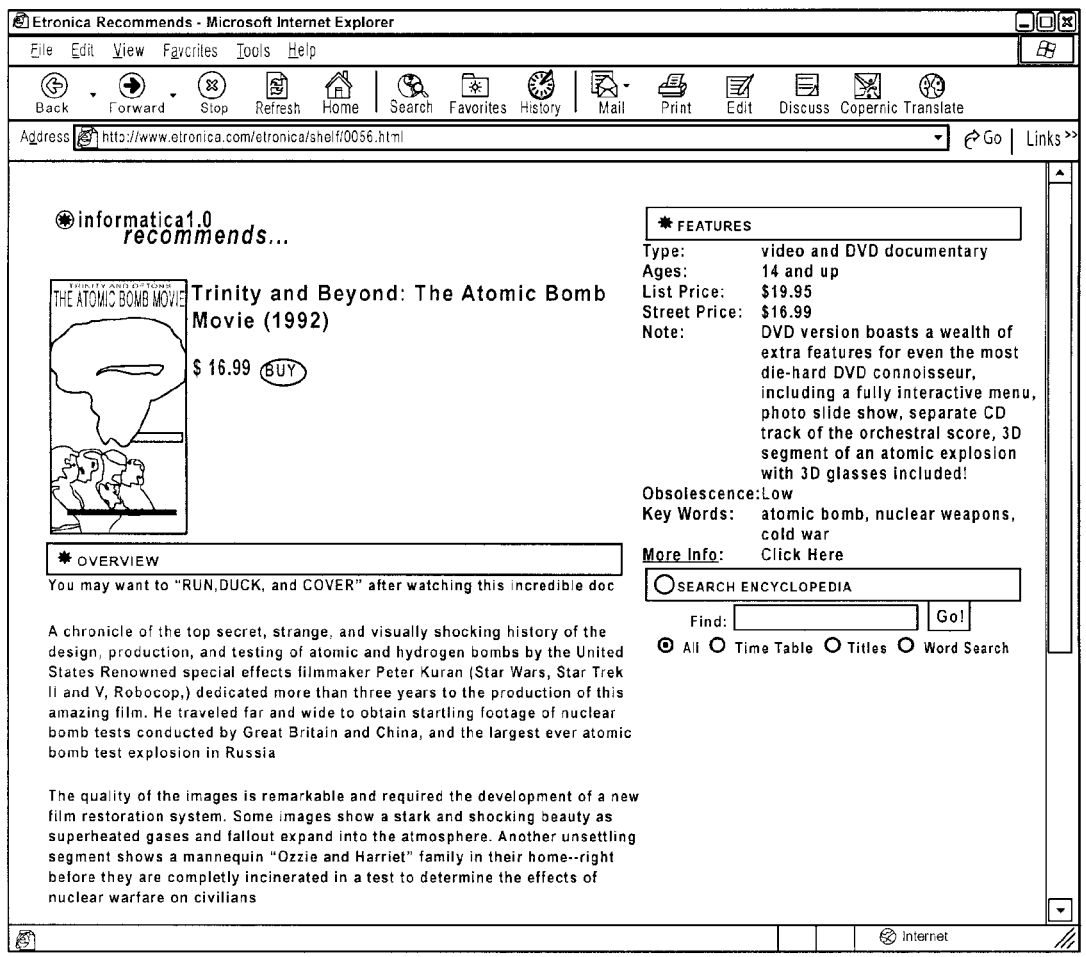

FIG. 8 depicts a screen page of an e-commerce offer, optimized and targeted on the basis of traffic analysis data. The keywords are chosen and sorted on the basis of traffic analysis, and the offer delivered to only those consumers whose interests match the 'keyword profile' of the merchandise offer.

Having thus described the invention,

We claim:

1. A computerized method for displaying a recommendation to a user of the World Wide Web, the method comprising:
    displaying a first webpage in response to a user request;
    metatagging one or more term within the first webpage as at least one keyword and referencing the at least one metatagged keyword to an unique article ID;
    identifying the at least one keyword by comparing the at least one metatagged keyword with a predefined keyword list using a statistical frequency analysis of keyword clusters to obtain a comparison result, the keyword cluster including two or more keywords in combination together; and
    displaying at least one second webpage to the user based on the identifying, wherein the at least one second webpage includes the recommendation of either a product or service determined using the statistical frequency analysis of the keyword clusters, the statistical frequency analysis further including analysis of at least one pilot keyword associated with the keyword clusters to denote a demographic, the recommendation of either a product or service associated with the demographic denoted by the pilot keyword.

2. The method of claim 1, comprising:
    sending at least one recommendation of webpage content to the user based on said comparison result.

3. The method of claim 1, wherein the displaying at least one second webpage to the user comprises:
    producing a plurality of related webpage contents ranked based upon at least one ranking criterion.

4. The method of claim 1, comprising:
    storing said at least one identified keyword in a database; and
    creating a user profile based on the storing.

5. The method of claim 4, wherein the displaying at least one second webpage to the user comprises:
    comparing the user profile with the predefined list of keywords;
    providing recommendations of web contents dynamically to the user based on the comparison result.

6. A computerized method for displaying a content recommendation to a user, the method comprising:
    receiving a request from the user to display at least one first content record from a plurality of records;
    generating customer behavior data from the at least one first content record;
    wherein generating comprises:
        metatagging one or more term from the at least one first content record as at least one keyword;
        referencing the at least one metatagged keyword to an unique article ID;
    comparing the generated customer behavior data with a predefined list of keyword clusters using a statistical frequency analysis of the keyword clusters to obtain a comparison result to identify the at least one keyword cluster, the keyword cluster including two or more keywords in combination together; and
    communicating at least one second webpage to the user based on the comparison, wherein the at least one second webpage includes the recommendation determined using the statistical frequency analysis of the keyword clusters, the statistical frequency analysis further including analysis of at least one pilot keyword associated with the keyword clusters to denote a demographic, the recommendation associated with the demographic denoted by the pilot keyword.

7. The method of claim 6, wherein the communicating the at least one second content record to the user includes displaying a plurality of second content records ranked based upon at least one ranking criterion.

8. The method of claim 6, wherein the at least one first and second content records comprise at least one of television programs information, film directories, reference directories, news program information, weather information, sports information, encyclopedic reference information, or financial information.

9. The method of claim 6, comprising:
   storing at least one metatagged keyword cluster in a database; and
   creating a user profile based on the storing.

10. The method of claim 9, wherein the communicating at least one second content record to the user is based at least in part on analyzing the user profile.

11. The method of claim 6, wherein the comparing the generated customer behavior data with a predefined list of keyword clusters comprises:
   wherein the communicating the at least one second content record to the user includes performing a Boolean ANDed query between the at least one metatagged keyword and the predefined list of keyword clusters.

12. The method of claim 11, comprising:
   analyzing the comparison result to determine a context;
   selecting at least one second content record based at least in part on the context; and
   wherein the communicating the at least one second content record to the user is based on the selecting.

13. The method as recited in claim 6, wherein the first and second content records are documents from the world wide web.

* * * * *